(12) United States Patent
Courpet et al.

(10) Patent No.: US 11,753,176 B2
(45) Date of Patent: Sep. 12, 2023

(54) FORWARD SECONDARY STRUCTURE FOR A MOUNTING PYLON OF AN AIRCRAFT

(71) Applicant: Airbus Operations (S.A.S.), Toulouse (FR)

(72) Inventors: Alexis Courpet, Toulouse (FR); Jean Geliot, Toulouse (FR); Arnaud Bourhis, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 7 days.

(21) Appl. No.: 17/558,213

(22) Filed: Dec. 21, 2021

(65) Prior Publication Data

US 2022/0219829 A1 Jul. 14, 2022

(30) Foreign Application Priority Data

Jan. 13, 2021 (FR) ...................................... 2100298

(51) Int. Cl.
*B64D 27/26* (2006.01)
*B64D 29/06* (2006.01)
*B64D 29/08* (2006.01)

(52) U.S. Cl.
CPC ............. *B64D 27/26* (2013.01); *B64D 29/06* (2013.01); *B64D 29/08* (2013.01); *B64D 2027/264* (2013.01)

(58) Field of Classification Search
CPC ........ B64D 27/26; B64D 29/06; B64D 29/08; B64D 2027/264
See application file for complete search history.

(56) References Cited

U.S. PATENT DOCUMENTS

| 6,220,546 | B1 * | 4/2001 | Klamka | ................. | B64D 29/00 244/129.4 |
| 9,873,504 | B2 * | 1/2018 | Aten | ........................ | B64C 7/02 |
| 2004/0227033 | A1 * | 11/2004 | Picard | .................... | B64D 27/12 244/54 |

FOREIGN PATENT DOCUMENTS

| EP | 3 620 388 A1 | 3/2020 |
| EP | 3 647 202 A1 | 5/2020 |
| EP | 3 656 676 A1 | 5/2020 |
| EP | 3 670 350 A1 | 6/2020 |

(Continued)

OTHER PUBLICATIONS

FR 3081837 A1 Translation (Year: 2019).*
French Search Report for Application No. 2100298 dated Sep. 21, 2021.

*Primary Examiner* — Christopher D Hutchens
*Assistant Examiner* — Steven J Shur
(74) *Attorney, Agent, or Firm* — KDW Firm PLLC

(57) ABSTRACT

A forward secondary structure for a mounting pylon for a turbomachine, the forward secondary structure extending from upstream to downstream along a longitudinal axis and having a chassis clad with an aerodynamic fairing. The aerodynamic fairing includes two adjacent cowls each having an upstream portion, where each of the cowls extends lengthwise along the longitudinal direction and includes in its upstream portion a system for articulating the cowl to the chassis, by which system the cowl can pivot with respect to the chassis about an axis of rotation normal to the longitudinal axis, between a closed position in which all of an inner face of the cowl is pressed against the chassis and an open position in which the cowl frees up an opening in the forward secondary structure.

17 Claims, 3 Drawing Sheets

(56) References Cited

FOREIGN PATENT DOCUMENTS

| | | | |
|---|---|---|---|
| FR | 3081837 A1 * | 12/2019 | ............ B64D 29/06 |
| FR | 3 088 906 A1 | 5/2020 | |
| FR | 3 081 837 A1 | 12/2020 | |

* cited by examiner

FORWARD SECONDARY STRUCTURE FOR A MOUNTING PYLON OF AN AIRCRAFT

CROSS-REFERENCE TO RELATED APPLICATION

This application claims priority to French patent application number 2100298 filed on Jan. 13, 2021, the entire disclosure of which is incorporated by reference herein.

TECHNICAL FIELD

The disclosure herein relates to a forward secondary structure for a mounting pylon of an aircraft.

BACKGROUND

As is conventional, and with reference to FIG. 1, each wing A of an aircraft supports at least one mounting pylon 1 which in turn supports a turbomachine 2 comprising a nacelle 3 that surrounds an engine (not shown).

The mounting pylon 1 comprises a primary structure (not shown) and secondary structures that are affixed to the primary structure and hold systems (for example hydraulic or electrical systems) while supporting the various aerodynamic fairings of the mounting pylon.

Secondary structures include a forward secondary structure 4 located at the front of the primary structure of the mounting pylon 1. When the mounting pylon 1 is installed beneath the wing A and supports the turbomachine 2, a forward aerodynamic fairing C of the forward secondary structure 4 provides an aerodynamic profile between the nacelle 3 and the front of the wing A. Patent application FR3088906 describes a forward secondary structure with a forward aerodynamic fairing comprising a starboard leaf and a port leaf arranged on either side of a longitudinal median plane of the forward secondary structure. Each leaf is articulated between a closed position in which it is in aerodynamic continuity with the fixed elements of the forward aerodynamic fairing, and an open position in which it frees up an opening allowing access to the systems contained in the pylon. Each leaf passes from the closed position to the open position by moving upwards and outwards from the forward secondary structure. The direction of opening of a first leaf is counter to the direction of opening of a second leaf, such that when the two leaves are both in the open position, technicians have a large opening for access to the systems.

One aim of the disclosure herein is an alternative to the abovementioned solution.

To that end, the disclosure herein relates to a forward secondary structure for a mounting pylon for a turbomachine, the forward secondary structure extending from upstream to downstream along a longitudinal axis, the forward secondary structure comprising a chassis that is clad with an aerodynamic fairing, and two adjacent cowls, each having an upstream portion, where each of the cowls extends lengthwise along the longitudinal direction and comprises in its upstream portion a system for articulating the cowl to the chassis, by which system the cowl can pivot with respect to the chassis about an axis of rotation that is normal to the longitudinal axis, between a closed position in which all of an inner face of the cowl is pressed against the chassis and an open position in which the cowl frees up an opening in the forward secondary structure.

The disclosure herein also relates to a pylon for mounting a turbomachine beneath the wing of an aircraft, the mounting pylon comprising a primary structure in the form of a box extending from front to rear along a longitudinal axis and comprising an upper face at the top and a lower face at the bottom, characterized in that a forward secondary structure according to the disclosure herein is attached to the front of the primary structure.

BRIEF DESCRIPTION OF THE DRAWINGS

The abovementioned features of the disclosure herein, as well as others, will appear more clearly upon reading the following description of an example embodiment, the description being provided with reference to the appended drawings, in which.

DETAILED DESCRIPTION

Figure 1:
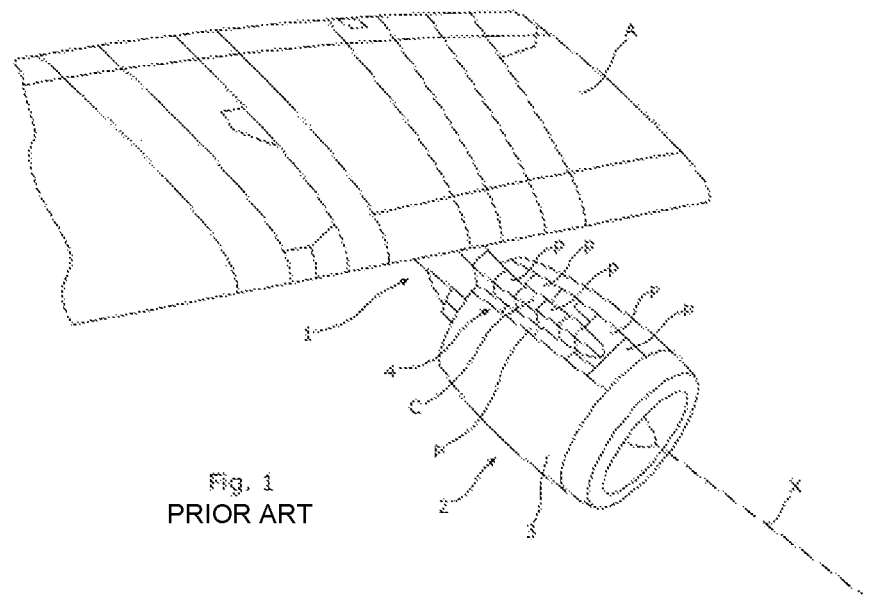
FIG. 1, which has already been described, is a front perspective view of a prior art mounting pylon equipped with its various aerodynamic fairings and mounted beneath a wing of an aircraft.
Figure 2:
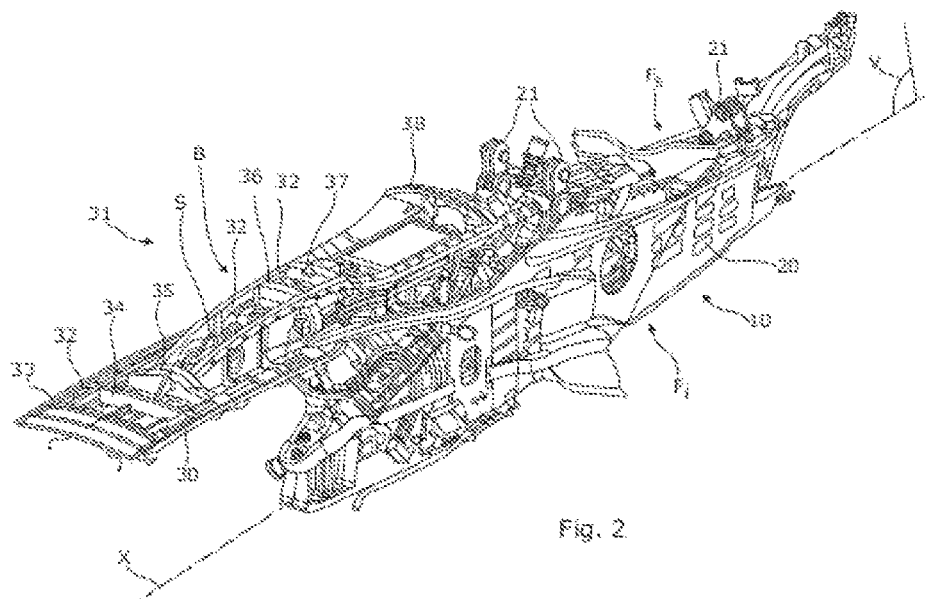
FIG. 2 is a perspective view of a mounting pylon comprising an unfaired forward secondary structure.

With reference to FIG. 2, a mounting pylon 10 for a turbomachine conventionally comprises a primary structure 20 that takes the form of a rigid box which extends lengthwise from forward (upstream) to rear (downstream) along a longitudinal axis X. The longitudinal median plane V is that plane which is parallel to the longitudinal axis X, is orthogonal to the ground and divides the mounting pylon 10 into two parts, left and right.

The box 20 comprises an upper face Fs at the top, and a lower face Fi at the bottom. When the mounting pylon 10 is attached beneath a wing of an aircraft, the upper face Fs faces the wing while the lower face Fi faces the ground.

As is known, a forward secondary structure 30 forms the front of the mounting pylon 10, and is attached to the front of the primary structure 20 in a cantilever arrangement with respect to the latter. The forward secondary structure 30, which extends from front to rear along the longitudinal axis X, serves to segregate and hold systems S passing through the mounting pylon.

The forward secondary structure 30 is constructed in the form of a chassis 31 made up of an assembly of stringers 32 and ribs 33-38, each stringer 32 extending along the longitudinal axis X of the mounting pylon 10 and each rib extending perpendicular to the stringers 32, that is to say in a plane T that is transverse to the longitudinal axis X. The ribs 33-38 have a shape that is curved and open towards the bottom.

The ribs 33-38, together with the stringers 32, form a cradle B.

Figure 3:
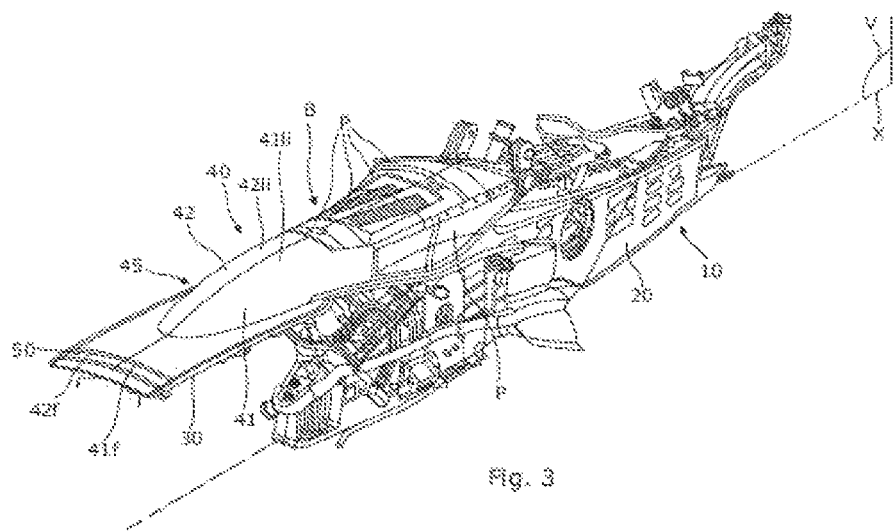
FIG. 3 is a view similar to FIG. 2, showing a mounting pylon comprising a forward secondary structure that is faired by a forward aerodynamic fairing comprising two cowls that are both shown in the closed position, according to one embodiment of the disclosure herein.
Figure 4:
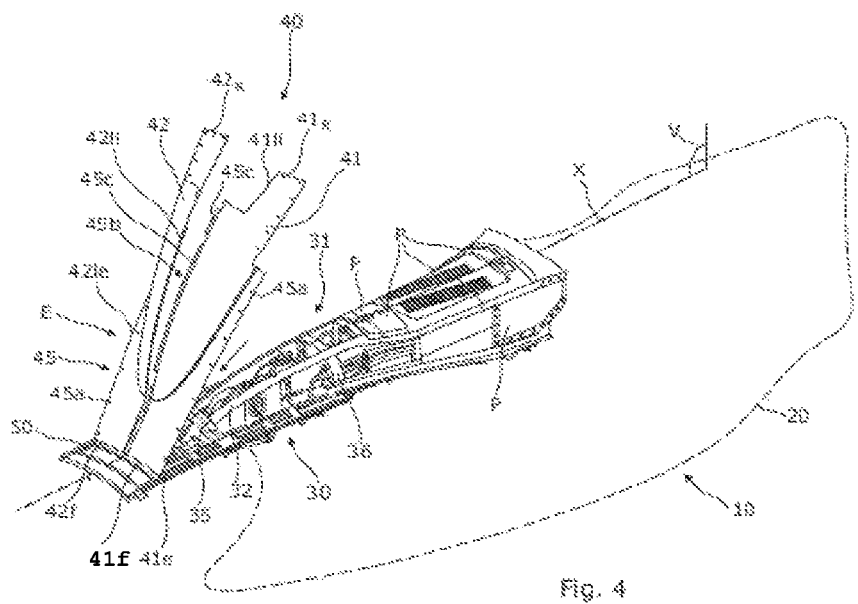
FIG. 4 is a perspective view of the forward secondary structure shown in FIG. 3, in which the two cowls are both in the open position.
Figure 5:
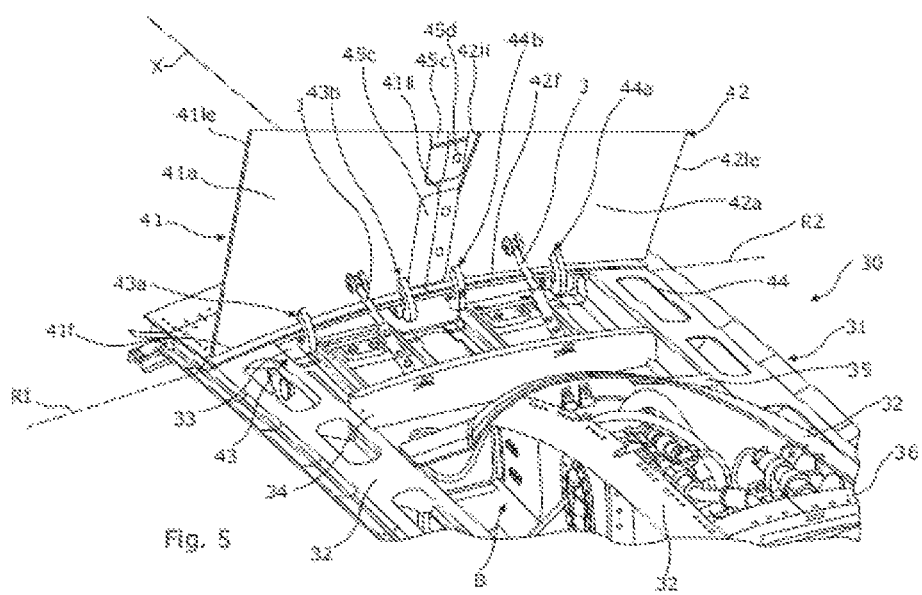
FIG. 5 is a perspective view of the region indicated by the arrow F depicted in FIG. 4, showing in detail the articulation of the two cowls to the chassis of the forward secondary structure.

FIGS. 3 through 5 show a forward secondary structure 40 and its forward aerodynamic fairing 40. According to the disclosure herein, this forward fairing comprises two adjacent cowls 41, 42 that extend from upstream to downstream along the longitudinal axis X and that are mounted articulated to the chassis 31.

Each of the cowls 41, 42 is mounted in articulated fashion with an axis of rotation R1, R2 that is normal to the longitudinal axis X at its upstream portion to the chassis 31 via an articulation system 43, 44 (particularly visible in FIG. 5) that allows each of the cowls 41, 42 to pivot with respect to the chassis between a closed position (FIG. 4) in which all of one face 41a, 42a of the cowl 41, 42, referred to as the inner face, is pressed against the chassis 31 and partially covers the cradle B, and an open position (FIG. 3) in which the cowl 41, 42 frees up an opening in the forward secondary structure 30 in order to allow access to the interior of the forward secondary structure 30.

Each cowl 41, 42 further comprises a system 45 for locking the cowls, in order to lock these in place in the closed position on the chassis 31.

From a viewpoint located to the rear of the mounting pylon and oriented towards the front of the pylon, the cowl 41 located on the left of the longitudinal median plane is referred to as the left-hand cowl in the rest of the description, and the cowl 42 located on the right of the longitudinal median plane is referred to as the right-hand cowl.

Each of the left and right cowls 41, 42 comprises four edges in opposite pairs. More particularly, each of the left and right cowls has a forward edge 41f, 42f which is arranged at the forward end of the cowl 41, 42, with respect to the longitudinal axis X, and which extends in a plane normal to the longitudinal axis X. Each of the left and right cowls 41, 42 has a rear edge 41r, 42r which is arranged at the rear of the cowl 41, 42 with respect to the longitudinal axis X.

Each of the left and right cowls 41, 42 also has two lateral edges that are generally parallel to the longitudinal axis X, with an inner lateral edge 41li, 42li and an outer lateral edge 41le, 42le. The two cowls 41, 42 are contiguous, with their inner lateral edges 41li, 42li also contiguous when the two cowls 41, 42 are both in the closed position.

In identical fashion for each of the left and right cowls 41, 42, the articulation system 43 associated with the left cowl 41, or respectively the articulation system 44 associated with the right cowl 42, is arranged at the forward edge 41f of the left cowl, respectively at the forward edge 42f of the right cowl, and comprises two hinges 43a-b, 44a-b, with one hinge 43a, 44a arranged on the side of the inner edge 41li, 42li of the cowl and one hinge 43b, 44b arranged on the side of the outer edge 41le, 42le of the cowl. Each hinge 43a-b, 44a-b comprises a gooseneck of which a first end is attached to the inner face 41a, 42a of the cowl and a second end is connected to a fitting attached to a rib 33 of the chassis by a pin. The pins of the two hinges 43a-b, 44a-b of an articulation system 43, 44, which are associated with a cowl 41, 42, are collinear and form the axis of rotation R1, R2 of the articulation system.

In the case of the cradle B having, over its entire length, a cross section that is in the shape of an arc of a circle which is open towards the bottom, the two articulation axes R1 and R2 of the two articulation systems 43, 44 are collinear.

The two cowls 41, 42 are mounted articulated to a same rib 33 of the chassis and the forward edge 41f of the left cowl 41 extends the forward edge 42f of the right cowl 42 (and vice versa) when the two cowls 41, 42 are both in the closed position.

The figures show the two cowls as being symmetrical with one another with the longitudinal median plane V as the plane of symmetry. This embodiment is the simplest for the manufacture and assembly of the cowls. In other variants (not shown), the cowls 41, 42 are not symmetrical.

When moving between the closed position and the open position, the left cowl 41, or respectively the right cowl 42, moves away from the chassis 31 in an upward movement. Conversely, when moving between the open position and the closed position, the left cowl 41, or respectively the right cowl 42, moves towards the chassis 31 in a downward movement.

When the two cowls 41, 42 are both in the closed position, the inner lateral edge 41li of the right cowl 41 is parallel to the inner lateral edge 42li of the right cowl 42.

The system for locking the cowls 45 comprises, for each cowl 41, 42, a plurality of through-orifices 45a (shown in FIG. 4) that are arranged both on the rear edge 41r, 42r and on the outer lateral edge 41le, 42le in order to permit the insertion of removable fasteners (not shown) for fastening the cowl 41, 42 to the chassis. The removable fasteners are for example of the screw or lock type.

Moreover, the cowl locking system 45 comprises securing structure 45b for securing the two cowls 41, 42. The securing structure 45b comprises:

at least one strip, and preferably a row of strips 45c, as illustrated in FIG. 5, that are riveted along the inner edge 41li of a first cowl, in this case the left cowl 41 in the example provided in the figures. Each strip 45c comprises a free portion that extends out of the first cowl 41 to which the strip is attached, towards the second cowl 42, in this case the right cowl in the example provided in the figures, and which forms a planar surface on which the second, right cowl 42 rests when the latter is in the closed position;

an anchor 45d, of the rivet nut type, arranged on the free portion of the strips 45c. The second cowl 42 is provided with through-orifices (not shown) that are arranged along its inner lateral edge 42li and each orifice opens onto a rivet nut 45d when the second cowl 42 is in the closed position.

When the two cowls 41, 42 are both in the closed position, the inner lateral edge 42li of the second cowl 42 rests on the free portion of the strips 45c, and the two cowls 41, 42 can be secured to each other by driving screws into the anchor 45d through the orifices of the right cowl 42.

Moreover, the strips 45c also serve to seal the join between the two cowls 41, 42 when the latter are both in the closed position.

When an operator wishes to have access to the systems S arranged beneath the cowls 41, 42, they must first separate the two cowls 41, 42 by unscrewing the screws from the anchor 45d, then move first the second cowl 42 to its open position, and thereafter the first cowl 41 to its open position. During refitting, these operations must be carried out in reverse order.

The length of each cowl 41, 42 is limited only by the necessity of dimensioning the articulation system 43, 44 associated with the cowl 41, 42 with limited mass and bulk, allowing it to be integrated into the forward secondary structure 30 despite there being little available space once the systems S have been installed.

Owing to the manner in which they are attached to the chassis 31, the cowls 41, 42 may extend over a great length and thus cover a large surface and hence take the place of a multitude of panels P that would conventionally be used to form an aerodynamic fairing. This makes it possible to reduce the number of fasteners and hence the time required to gain access to the systems positioned beneath the forward aerodynamic fairing 40. Furthermore, replacing a multitude of panels with only two cowls 41, 42 serves to improve the aerodynamics of the forward aerodynamic fairing 40 of the forward secondary structure 30 by eliminating surface gaps which exist between the panels.

In the embodiment illustrated in FIGS. 3 through 5, the cowls 41, 42 do not cover the entire length of the chassis 31 along the longitudinal axis X. According to this embodiment, the forward aerodynamic fairing 40 of the forward secondary structure 30 comprises, from front to rear, a band 50 which covers the front of the chassis and which is attached to the latter by screws (not shown), then the movable cowls according to the disclosure herein (the two cowls being of identical shape and length, and each cowl 41, 42 extends over a majority of the length of the forward secondary structure 30, covering part of the cradle B), then, at the rear of the forward secondary structure 30, panels P attached to the chassis 31 by screws in order to cover the rest of the chassis.

Preferably, and as illustrated in FIG. 5, each of the left and right cowls 41, 42 comprises an actuator J, of the pneumatic or gas cylinder type, for helping to open the articulated cowl 41, 42 and to hold it in the open position. The actuator J is for example a gas cylinder. Each actuator J associated with a cowl comprises a first end attached to the chassis 31, more specifically to the rib 34 following the rib 33 to which the cowls 41, 42 are articulated, and a second end attached to the inner face 41a, 42a of the cowl at a point remote from the articulation system 43, 44 associated with the cowl 41, 42.

A system of the stay type (not shown) may also be arranged to hold the cowls 41, 42 in the open position. For each cowl 41, 42, the stay consists of or comprises a rod whose first end is pivotably attached to the rib 33 to which the cowls 41, 42 are articulated, and whose second end can be inserted into an anchor point arranged on the inner face 41a, 42a of the cowl. The anchor point is positioned in such a way that the second end of the rod can be inserted therein when the cowl is in the open position.

The disclosure herein as described above can use a horseshoe-shaped cradle B that is open towards the bottom, changing the orientation of the axis of rotation R1 of the articulation system 43 of the left cowl 41 with respect to the orientation of the axis of rotation R2 of the articulation system 44 of the right cowl 42. In the example shown in FIG. 5, the chassis 31 has a particular shape since the shape of the ribs 33-38 in the transverse plane T changes from front to rear in the longitudinal direction X of the mounting pylon 10. Thus, from front to rear in the longitudinal direction X of the mounting pylon, the ribs (ribs 33, 34) have first of all in the transverse plane a shape that is slightly curved and open towards the bottom, then (rib 35) an omega shape that is open towards the bottom, then (ribs 36-38) a horseshoe shape that is open towards the bottom.

In order to use this particular shape of the cradle B, the axis of rotation R1 of the articulation system 43 of the left cowl 41 and the axis of rotation R2 of the articulation system 44 of the right cowl 42 are not mutually collinear but instead are coplanar and intersect with an obtuse angle between them, the apex of this angle being oriented upwards. The axis of rotation R1 of the articulation system 43 of the left cowl 41 and the axis of rotation R2 of the articulation system 44 of the right cowl 42 remain normal to the longitudinal axis X.

Thus, when moving between the closed position and the open position, the left cowl 41, or respectively the right cowl 42, moves away from the chassis 31 with a movement that is oriented both laterally outwards from the chassis 31 and upwards from the chassis 31. Conversely, when moving between the open position and the closed position, the left cowl 41, or respectively the right cowl 42, moves towards the chassis 31 with a movement that is oriented both laterally towards the interior of the chassis 31 and towards the bottom of the chassis 31.

This particular arrangement of the axes of rotation R1, R2 means that when the two cowls 41, 42 are both in the closed position, the inner lateral edge 41li of the left cowl 41 is parallel to the inner lateral edge 42li of the right cowl 42. By contrast, when the two cowls 41, 42 are both in the open position, the inner lateral edge 41li of the left cowl 41 and the inner lateral edge 42li of the right cowl 42 are no longer parallel but rather form between them an angle whose apex is oriented towards the front of the mounting pylon 10.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A forward secondary structure for a mounting pylon for a turbomachine, the forward secondary structure comprising:

an aerodynamic fairing comprising a first cowl and a second cowl, the first cowl being adjacent to the second cowl; and a chassis clad with the aerodynamic fairing;

wherein the forward secondary structure extends from upstream to downstream along a longitudinal axis;

wherein the first cowl has an upstream portion;

wherein the second cowl has an upstream portion;

wherein the first cowl extends lengthwise along a longitudinal direction and comprises, in the upstream portion thereof, an articulation system for articulating the first cowl to the chassis, by which articulation system the first cowl can pivot, with respect to the chassis about an axis of rotation that is normal to the longitudinal axis, between a closed position, in which all of an inner face of the first cowl is pressed against the chassis, and an open position, in which the first cowl frees up an opening in the forward secondary structure; and wherein the second cowl extends lengthwise along the longitudinal direction and comprises, in the upstream portion thereof, an articulation system for articulating the second cowl to the chassis, by which articulation system the second cowl can pivot, with respect to the chassis about an axis of rotation that is normal to the longitudinal axis, between a closed position, in which all of an inner face of the second cowl is pressed against the chassis, and an open position, in which the second cowl frees up an opening in the forward secondary structure.

2. The forward secondary structure according to claim 1, wherein:

the chassis comprises:

an assembly of ribs, each rib of the assembly of ribs extending in a respective plane that is normal to the longitudinal axis; and stringers, each of which extends in a respective plane that is parallel to the longitudinal axis; and, the two cowls are articulated to a same rib of the assembly of ribs.

3. The forward secondary structure according to claim 2, wherein:

the first cowl is located on an opposite side of a longitudinal median plane of the forward secondary structure from the second cowl; and the first cowl is symmetrical with the second cowl.

4. The forward secondary structure according to claim 1, wherein the axis of rotation of the first cowl and the axis of rotation of the second cowl are collinear.

5. The forward secondary structure according to claim 1, wherein the axis of rotation of the first cowl and the axis of rotation of the second cowl are coplanar and are arranged such that an angle is formed between the axis of rotation of the first cowl and the axis of rotation of the second cowl.

6. The forward secondary structure according to claim 5, wherein the angle formed between the axis of rotation of the first cowl and the axis of rotation of the second cowl is an obtuse angle where the axis of rotation of the first cowl and the axis of rotation of the second cowl intersect each other.

7. The forward secondary structure according to claim 1, wherein:

the first cowl comprises four edges in opposite pairs, the four edges of the first cowl comprising:

a forward edge arranged at a forward end of the first cowl and extending in a plane normal to the longitudinal axis;

a rear edge arranged at a rear of the first cowl; and two lateral edges that are parallel to the longitudinal axis, the two lateral edges comprising an inner lateral edge and an outer lateral edge; and the second cowl comprises four edges in opposite pairs, the four edges of the second cowl comprising:

a forward edge arranged at a forward end of the second cowl and extending in a plane normal to the longitudinal axis;

a rear edge arranged at a rear of the second cowl; and two lateral edges that are parallel to the longitudinal axis, the two lateral edges comprising an inner lateral edge and an outer lateral edge; and the inner lateral edge of the first cowl being contiguous with and parallel to the inner lateral edge of the second cowl when the first cowl and the second cowl are both in the closed position.

8. The forward secondary structure according to claim 7, wherein the outer lateral edge of the first cowl and the outer lateral edge of the second cowl are spaced apart from each other and on opposite sides of the forward secondary structure from each other when the first cowl and the second cowl are both in the closed position and also when the first cowl and the second cowl are both in the open position.

9. The forward secondary structure according to claim 1, wherein:

the articulation system of the first cowl comprises a first hinge arranged on a side of an inner edge of the first cowl and a second hinge arranged on a side of an outer edge of the first cowl; and the articulation system of the second cowl comprises a first hinge arranged on a side of an inner edge of the second cowl and a second hinge arranged on a side of an outer edge of the second cowl.

10. The forward secondary structure according to claim 9, wherein:

the first hinge and the second hinge of the articulation system of the first cowl are both at a forward edge of the first cowl; and the first hinge and the second hinge of the articulation system of the second cowl are both at a forward edge of the second cowl.

11. The forward secondary structure according to claim 10, wherein:

the first hinge and the second hinge of the articulation system of the first cowl comprise a gooseneck, a first end of which is attached to the inner face of the first cowl for both the first hinge and the second hinge of the first cowl and a second end of which is connected to a fitting attached to a rib of the chassis by a respective pin for both the first hinge and the second hinge of the first cowl; and the first hinge and the second hinge of the articulation system of the second cowl comprise a gooseneck, a first end of which is attached to the inner face of the second cowl for both the first hinge and the second hinge of the second cowl and a second end of which is connected to a fitting attached to the rib of the chassis by a respective pin for both the first hinge and the second hinge of the second cowl.

12. The forward secondary structure according to claim 11, wherein the respective pins of the articulation system of the first cowl are arranged collinear to each other and form the axis of rotation of the articulation system of the first cowl.

13. The forward secondary structure according to claim 12, wherein the respective pins of the articulation system of the second cowl are arranged collinear to each other and form the axis of rotation of the articulation system of the second cowl.

14. The forward secondary structure according to claim 11, wherein the respective pins of the articulation system of the second cowl are arranged collinear to each other and form the axis of rotation of the articulation system of the second cowl.

15. The forward secondary structure according to claim 1, wherein at least one strip is attached to the inner face and along an inner edge of the first cowl, each strip of the at least one strip comprising a free portion that extends out of the first cowl and forms a planar surface on which the second cowl rests when the first cowl and the second cowl are both in the closed position.

16. The forward secondary structure according to claim 1, wherein:

the first cowl comprises an actuator for helping to open the first cowl and to hold the first cowl in the open position, the actuator associated with the first cowl comprising a first end attached to the chassis and a second end attached to the inner face of the first cowl; and the second cowl comprises an actuator for helping to open the second cowl and to hold the second cowl in the open position, the actuator associated with the second cowl comprising a first end attached to the chassis and a second end attached to the inner face of the second cowl.

17. A pylon for mounting a turbomachine beneath a wing of an aircraft, the pylon comprising:

a primary structure in a form of a box extending from front to rear along a longitudinal axis and comprising an upper face at a top and a lower face at a bottom; and the forward secondary structure according to claim 1 attached to a front of the primary structure.

\* \* \* \* \*